United States Patent [19]

Long et al.

[11] 4,349,518
[45] Sep. 14, 1982

[54] METHOD OF MAKING HIGH PURITY CALCIUM HYDROGEN PHOSPHATE DIHYDRATE

[75] Inventors: Robert A. Long; Albert K. Fan, both of Bradford, Pa.

[73] Assignee: GTE Products Corporation, Stamford, Conn.

[21] Appl. No.: 257,821

[22] Filed: Apr. 27, 1981

[51] Int. Cl.³ ............................................. C01B 25/32
[52] U.S. Cl. ..................................................... 423/308
[58] Field of Search ................................. 423/308, 309

[56] References Cited

U.S. PATENT DOCUMENTS

| | | | |
|---|---|---|---|
| 3,294,486 | 12/1966 | Cremer et al. | 423/309 |
| 3,395,979 | 8/1968 | Schafer | 423/308 |
| 3,505,012 | 4/1970 | Dale et al. | 423/308 |
| 3,509,070 | 4/1970 | Lapidus | 423/308 |
| 4,178,355 | 12/1979 | Heytmeijer et al. | 423/308 |

Primary Examiner—O. R. Vertiz
Assistant Examiner—Wayne A. Langel
Attorney, Agent, or Firm—James Theodosopoulos

[57] ABSTRACT

A continuous process for manufacture of brushite, $CaHPO_4.2H_2O$, is disclosed. Calcium and phosphate ions are mixed in a container to produce brushite precipitate, which is then continuously introduced into second and third containers where the pH is raised to reduce brushite solubility. The brushite is then filtered in a continuous process, washed, refiltered, and rewashed before being converted to anhydrous calcium hydrogen phosphate.

9 Claims, 1 Drawing Figure

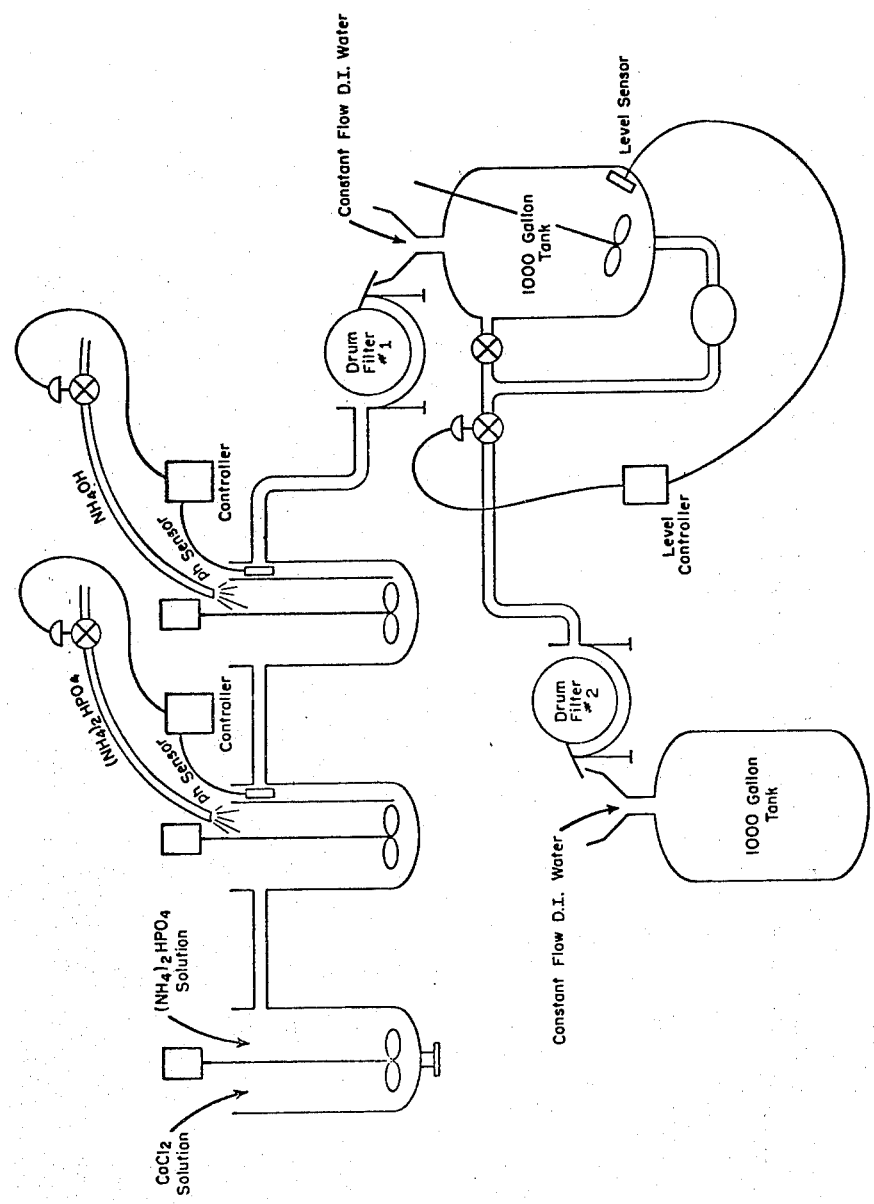

METHOD OF MAKING HIGH PURITY CALCIUM HYDROGEN PHOSPHATE DIHYDRATE

This invention is concerned with the manufacture of calcium hydrogen phosphate dihydrate, $CaHPO_4.2H_2O$, also called brushite. Brushite is used in the manufacture of phosphate phosphors, for example, pyro-, ortho- and halo-phosphate and is disclosed in U.S. Pat. Nos. 3,065,053; 3,068,067; 3,095,269; 3,110,560, 3,505,012; 3,654,173; 3,654,174 and in U.S. published patent application B 345 390.

In the prior art, brushite was made by mixing sources of calcium and phosphate ions, for example, calcium chloride and diammonium phosphate solutions, which resulted in brushite precipitate. The brushite was filtered, washed and refiltered. A disadvantage to the prior art process is the excessive loss of calcium, because of the solubility of the calcium phosphate in the mother liquor. Also, the prior art process is a batch process and is, thus, quite expensive.

This invention discloses a continuous process for the manufacture of brushite, which is less expensive than the prior art batch process and which results in less calcium loss. Sources of calcium ions and phosphate ions are continuously introduced into a container where they react to produce brushite precipitate. The calcium source is in excess of the stoichiometric amount. The precipitate, in slurry form, is introduced into a second container to which an ammonium phoshate is added in metered amounts in order to control pH. Next, the brushite is introduced to a third container where ammonium hydroxide is added in controlled amounts in order to raise and control the pH to a point where the solubility of brushite is low. The brushite is then filtered on a drum filter. The cake from the drum filter is reslurried with deionized water, washed and then filtered again.

The drawing is a schematic of apparatus for practicing one embodiment of the invention.

In one embodiment, as shown in the drawing, calcium chloride solution and diammonium phosphate solution are continually introduced into a 35 gallon container where they react to produce a slurry of brushite, which is maintained in suspension by a stirrer. The pH of the slurry is about 3.5-4.0. In one example the concentration of each solution was 2.1 pounds per gallon and each flow rate was 12.8 liters per minute. This was equivalent to a 20% excess of calcium above stoichiometry, an excess being necessary to prevent formation of hydroxyapatite. The slurry from two such containers (only one is shown in the drawing) overflows into another 35 gallon mixing container into which diammonium phosphate solution is sprayed in order to maintain a pH of about 4.5, the pH being controlled by a pH sensor and controller for a control valve for the diammonium phosphate. In the example described, the flow rate for the diammonium phosphate was about 3 liters per minute, the concentration thereof being also about 2.1 pounds per gallon. The slurry from this container overflows into another 35 gallon mixing container into which ammonium hydroxide is metered, by means of a pH sensor, controller and control valve, to adjacent the pH to about 6.5, thus decreasing the brushite solubility. The slurry then overflows into a rotating drum filter, drum filter #1 in the drawing, and is filtered. The filter cake is continuously removed and reslurried with deionized water into a 1000 gallon mixing tank in which the level of the slurry is monitored and controlled. The slurry from this tank overflows into another rotating drum filter, drum filter #2 in the drawing, and is again filtered, and again removed and reslurried into another 1000 gallon washing tank. The contents of this tank are emptied about once an hour and heated, in a steam-jacketed glass lined converter, to convert the brushite to monetite, the anhydrous form of calcium hydrogen phosphate. One effect of the second washing is to reduce the sodium impurity level from about 4000 parts per million after the first washing to about 400 parts per million. The process yields about 800 pounds of monetite powder per hour. The monetite is used, in known manner, to produce various phosphate phosphors.

We claim:

1. A method of making brushite by continuous process comprising: continuously introducing solutions containing calcium ions and phosphate ions into a mixing container to form a slurry of brushite therein, the pH of the slurry in said mixing container being about 3.5-4.0; continuously introducing slurry from said mixing container into a second container to which metered amounts of ammonium phosphate are added tomaintain and control pH to a pH higher than that in said mixing container; continuously introducing slurry from said second container into a third container to which metered amounts of ammonium hydroxide are added to maintain and control pH at a pH where brushite solubility is low; continuously introducing slurry from said third container to continuous filtering means where a filter cake is formed; continuously removing filter cake from said filtering means and reslurrying it in water for washing; continuously introducing the reslurry to a second continuous filtering means where a second filter cake is formed; and continuously removing said second filter cake from said second filtering means and again reslurrying it in wash water.

2. The method of claim 1 wherein the amount of calcium ions added is in stoichiometric excess of the amount of phosphate ions.

3. The method of claim 2 wherein said stoichiometric excess is about 20%.

4. The method of claim 1 wheren the pH of the slurry in said second container is about 4.5.

5. The method of claim 1 wherein the pH of the slurry in said third container is about 6.5.

6. The method of claim 1 wherein the solutions containing calcium ions and phosphate ions are solutions of calcium chloride and diammonium phosphate.

7. The method of claim 1 wherein the slurry in said mixing container overflows into said second container.

8. The method of claim 1 wherein the slurry in said second container overflows into said third container, and then overflows into a rotating drum filter.

9. The method of claim 1 wherein said reslurrying said second filter cake in wash water reduces the sodium content of the brushite by about a factor of 10.

* * * * *